United States Patent

[11] 3,626,392

[72] Inventors Irving W. Wolf;
Andre A. Jaecklin, both of Palo Alto, Calif.
[21] Appl. No. 3,969
[22] Filed Jan. 26, 1970
[45] Patented Dec. 7, 1971
[73] Assignee Ampex Corporation
Redwood City, Calif.
Original application Nov. 16, 1965, Ser. No. 508,108, now Patent No. 3,626,392. Divided and this application Jan. 26, 1970, Ser. No. 3,969

[54] COMPOSITE THIN FILM MEMORY
5 Claims, 3 Drawing Figs.

[52] U.S. Cl. .......... 340/174QA, 340/174 NA, 340/174 TF

[51] Int. Cl. .......... G11c 11/14
[50] Field of Search .......... 340/174 TF

[56] References Cited

UNITED STATES PATENTS

| | | | |
|---|---|---|---|
| 3,230,515 | 1/1966 | Smaller .......... | 340/174 |
| 3,466,635 | 9/1969 | Middlehoek .......... | 340/174 |

*Primary Examiner*—James W. Moffitt
*Attorney*—Robert G. Clay

ABSTRACT: A thin film storage memory, wherein a high-coercive force film is deposited as a separate layer on a continuous low-coercive force film, in a selected pattern as determined by a masking coating of electrically nonconductive material. This provides a memory with storage provided in the low-coercive force film windows, bounded by the high-coercive force film.

IRVING W. WOLF &
ANDRE A. JAECKLIN
INVENTOR.

BY Robert G. Clay

ATTORNEY

COMPOSITE THIN FILM MEMORY

This is a division of application Ser. No. 508,108, filed Nov. 16, 1965.

The present invention relates to thin film memories and their method of manufacture.

The formation of unwanted edge domains in the boundary of magnetically "soft," i.e., low-coercive force thin films of the order of 2 oersteds, by demagnetizing fields has been a fundamental problem in providing thin film memory devices. In applications where the motion of domain walls is to be confined to certain prescribed paths this effect must be eliminated because nucleation of new domains provides misinformation. To this end, various techniques and film constructions have been developed which utilize in general a soft film window to define the region of interest wherein information is stored. Such constructions have generally utilized a high-coercive force, i.e., "hard," film guard strip, of the order of 20 oersteds, surrounding the soft film wherein the hard film strip suppresses the formation of the unwanted edge domains. This high-coercive force guard strip in one instance is prepared by masked evaporation which provides a film configuration having tapered edges, wherein the coercive force, $H_c$, varies inversely with thickness. In other embodiments, $H_c$ is controlled by alloy composition or by controlling the surface roughness of the substrate surrounding the desired area. Such prior art techniques and thin film constructions generally lack good edge definition or are very difficult to fabricate.

It is accordingly an object of the present invention to provide a novel thin film storage memory and method of fabrication utilizing a composite layer configuration of high and low coercive force films to constrain domain walls to localized regions within the film memory, while lending itself to relatively simple fabrication procedures. To simplify the description high and low coercive force films are hereinafter termed "-hard" and "soft" films, respectively.

Other objects and advantages will be apparent from the specification taken in conjunction with the drawings wherein.

Briefly, in accordance with the invention, the desired portion of a soft film is masked with a nonconductive coating, and a hard film is electroplated as a separate and distinct layer onto the remaining exposed portions of the soft film. This provides a soft film window configuration wherein information may be stored, having a preselected design as defined by a surrounding hard film. The hard boundary of the composite film memory provides a barrier to domain walls which move in the soft film, and simultaneously suppresses the formation of edge domains. Due to the particular layered configuration, fabrication of the above-described, thin film storage memory can be readily accomplished utilizing the versatile and relatively simple photoresist processes in the particular manner described hereinafter.

Figure 1:
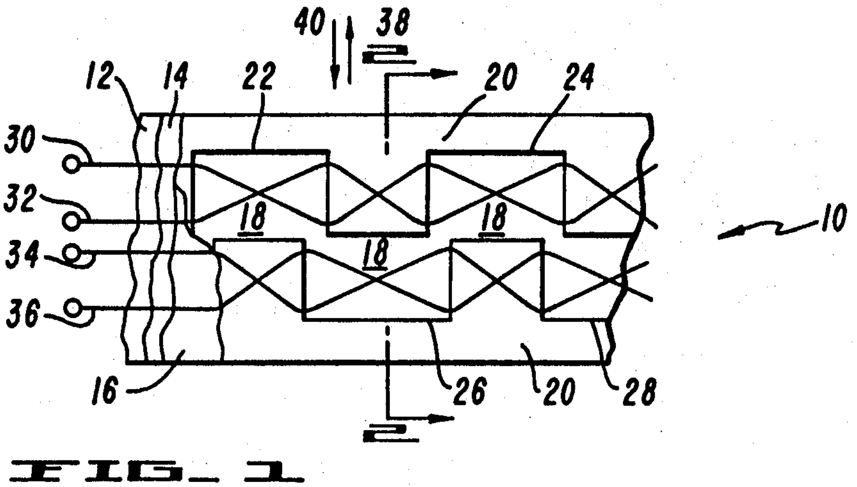
FIG. 1 is a top view of a portion of composite thin film memory of the present invention, further depicting coils for applying a magnetic field thereto.
Figure 2:
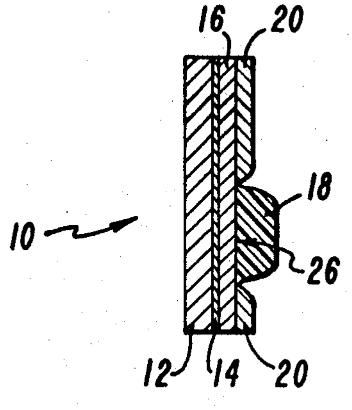
FIG. 2 is a cross-sectional view taken along lines 2—2 of FIG. 1 showing the composite film construction.

Referring to FIGS. 1 and 2, a thin film memory 10 is formed utilizing a glass substrate 12 upon which is sputtered a layer of gold 14. A low-coercive force magnetic film 16 is electroplated onto the gold layer 14 to form a "soft" film of the type described for example in copending U.S. Pat. applications Ser. No. 387,427 filed Aug. 4, 1964 in the name of Irving W. Wolf and now U.S. Pat. No. 3,417,385 issued Dec. 17, 1968, and Ser. No. 387,426 filed Aug. 4, 1964 in the names of Irving W. Wolf and Andre A. Jaecklin and now U.S. Pat. No. 3,427,603 issued Feb. 11, 1969. In accordance with the invention, portions of the soft film are then masked with a nonconductive coating 18 in the form of the pattern desired. A "-hard" magnetic film 20 is thereafter electroplated or otherwise deposited onto the portions of the soft film not masked by the coating 18, to provide a desired pattern of exposed soft film windows within the composite thin film memory 10.

As exemplified in FIGS. 1 and 2 the thin film storage memory 10 is formed in a particular embodiment, with a plurality of magnetic thin film sites 22–28 arranged in a multiple level, staggered array. As shown pictorially in FIG. 2, each level of sites 22, 24 and 26, 28 have disposed therealong coils 30, 32 and 34, 36 respectively, for applying a magnetic field thereto in a first preferred direction and a second preferred direction. In the particular embodiment of FIG. 2 wherein the coils extend generally in a horizontal direction the first preferred direction of magnetization is as indicated by arrow 38, and the second preferred direction is as indicated by arrow 40. It is to be understood that although rectangular shaped sites with horizontally oriented coils are exemplified herein, there are various memory geometries and coil configurations with which the invention may be utilized. For example, the composite hard and soft film memory configuration of the invention can be formed to define a single elongated soft film window bordered by straight strips of hard film at either edge thereof, wherein the advantages of good edge definition and ease of fabrication processes can be realized. Such alternative arrangements are further exemplified and their operation is described in the two above-mentioned copending applications, and accordingly is not further disclosed herein.

Fabrication of the thin film memory 10 is performed by first electrodepositing a low-coercive force film on the substrate 12, which can be formed of several types of material such as for example, glass, plastic and aluminum. Thereafter, the desired pattern, as depicted in the drawing, is obtained by depositing the nonconductive coating 18, utilizing for example various photoresist processes known in the art and exemplified by the Kodak photoresist process, as described in the Kodak Industrial Data Book, P-7, 1964, entitled "Kodak Photosensitive Resists for Industry." The masked soft film is then placed in an electrolytic solution having predetermined proportions of the combinations, cobalt, nickel and iron, cobalt and copper, or cobalt, nickel, iron and copper. The hard film 20 is thus deposited on the unmasked portions of the soft film by an electroplating process.

The following exemplify the basic proportions utilized in the above-mentioned electrolytic solutions:

1. Nickel—74 percent by weight
   Iron—18.5 percent by weight
   Cobalt—7.5 percent by weight
2. Cobalt approximately 60 percent by weight
   Copper approximately 40 percent by weight
3. Nickel approximately 74 percent by weight
   Iron approximately 18.5 percent by weight
   Cobalt approximately 7.5 percent by weight
   Copper approximately 1 to 5 percent by weight A further description of the electroplating process for deposition of the hard as well as soft films is found in the article "The Effect of Small Quantities of Copper on the Magnetic Properties of Electrodeposited Permalloys," I. W. Wolf (Electric and Magnetic Properties of Thin Metallic Layers Conference) 1961, Palace of the Academy, Brussels.

The nonconductive coating 18 may be removed by means of the usual developing process associated with the above-mentioned Kodak photoresist process, however the composite thin film memory 10 may be utilized with or without removal of the coating 18.

It has been found that an optimum value for the thickness of the hard film is of the order of 500 to 1200 A. and that of the soft film 500 to 1500 A. Too thin a hard film results in the lack of a barrier to the wall, while too thick a hard film results in the spontaneous forming of edge domains at the boundary. There are, of course, optimum values of thickness for the films depending upon the type and proportions of the materials used in their formation.

Figure 3:
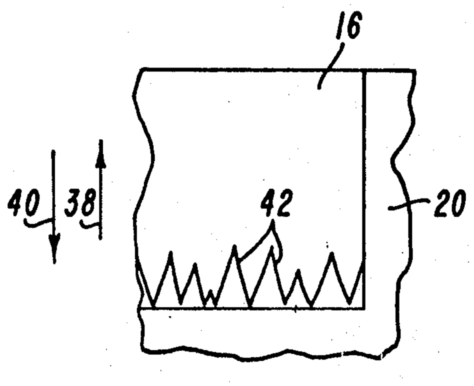
FIG. 3 is a view of a zigzag wall which was propagated along the easy axis of the soft film, depicting the arrest thereof at the hard film boundary of the invention.

The film characteristics were monitored with a hysteresigraph while details of the domain structure and the field penetration or "punch-through" behavior, $H_{pt}$, which defines the useful operating margin, where observed by means of the Kerr effect and Bitter patterns. Typical parameters for the soft films were, $H_c \approx 2$ oersteds, $H_k$=6–15 oersteds: for the hard films, $H_c \approx 20$ oersteds, for the composite portion of memory 10 of the invention, $H_c$=6–15 oersteds, $H_k$=15–20 oersteds, wherein $H_k$ is the induced anisotropy filed, and $H_c$ is the coercive force field. An asymmetric hysteresis loop was observed, indicating suppression of the edge domains. As shown in FIG. 3, a zigzag wall indicated by numeral 42, propagated along the easy axis of the soft film 16, was arrested with good edge definition at the composite barrier, i.e., the edge of the hard film 20. A substantial increase in field was required to cause the wall 42 to penetrate or "punch-through" into the composite film, thereby indicating the effectiveness of the composite film memory 10 in constraining domain walls.

In the claims:

1. A thin film memory comprising:

substrate means;

a thin film of low-coercive force material continuously disposed over a surface of the substrate means; and a thin film of high coercive force material superimposed as a distinct and separate layer on preselected portions of the low-coercive force material to define a preselected pattern of exposed low-coercive force material, wherein the exposed pattern of low-coercive force material provides magnetic field retaining windows bordered and thus defined by the superimposed separate layer of the high-coercive force material.

2. The thin film memory of claim 1 wherein the thickness of the low-coercive force film is of the order of 500 to 1500 A, and the thickness of the high-coercive force film is of the order of 500 to 1200 A.

3. The thin film memory of claim 1 wherein the high-coercive force film is formed of cobalt, nickel, iron and copper in approximately the proportions 7.5 percent, 74 percent, 18.5 percent, 1 to 5 percent, by weight respectively.

4. The thin film memory of claim 1 wherein the high-coercive force film is formed of cobalt, nickel and iron is substantially the proportions 7.5 percent, 74 percent, 18.5 percent by weight respectively.

5. The thin film memory of claim 1 wherein the high-coercive force film is formed of cobalt and copper in approximately the proportions 60 percent and 40 percent by weight respectively.

* * * * *